2 Sheets—Sheet 1.

H. VAN DE WATER,

Assignor to O. J. BOLLINGER.

WATER WHEEL.

No. 10,247. Reissued Nov. 21, 1882.

Attest:
Courtney A. Cooper
A. E. Fanemann.

Inventor:
Henry Van de Water
By his attorney
Charles E. Foster

N. PETERS, Photo-Lithographer, Washington, D. C.

2 Sheets—Sheet 2.

H. VAN DE WATER,

Assignor to O. J. BOLLINGER.

WATER WHEEL.

No. 10,247. Reissued Nov. 21, 1882.

Attest:
Courtney A. Cooper.
F. C. Havemann.

Inventor:
Henry Van de Water
By his attorney
Charles E. Foster

N. PETERS. Photo-Lithographer, Washington, D. C.

UNITED STATES PATENT OFFICE.

HENRY VAN DE WATER, OF AUBURN, NEW YORK, ASSIGNOR TO OLIVER J. BOLLINGER, OF YORK, PENNSYLVANIA.

WATER-WHEEL.

SPECIFICATION forming part of Reissued Letters Patent No. 10,247, dated November 21, 1882.

Original No. 178,567, dated June 13, 1876. Application for reissue filed October 12, 1881.

*To all whom it may concern:*

Be it known that I, H. VAN DE WATER, now residing at Auburn, Cayuga county, New York, have invented Improvements in Turbine Water-Wheels, of which the following is the specification.

My invention is an improvement upon the water-wheel described in the Letters Patent granted to J. Temple, February 8, 1859; and it consists in the peculiar construction of the gates and arrangement of the guards, whereby to prevent leakage, facilitate manipulation, and secure increased efficiency.

Figure 1:
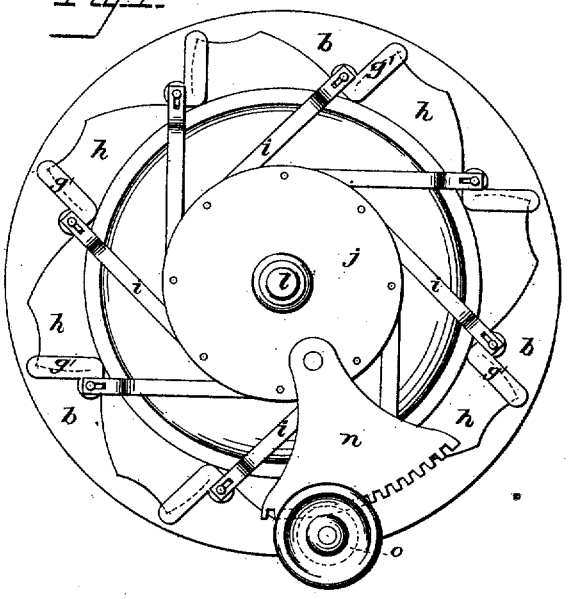
Figure 2:
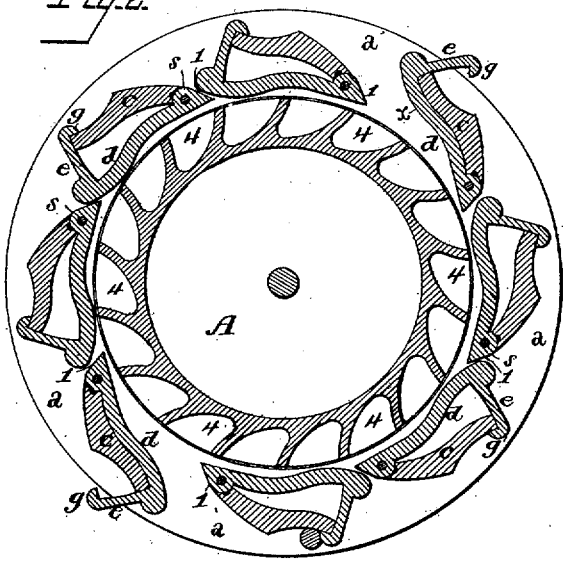
Figure 3:
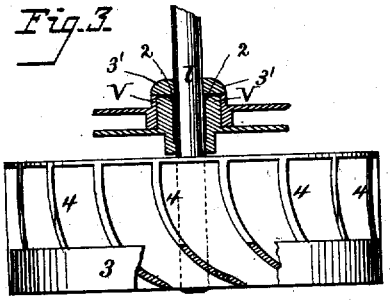
Figure 4:
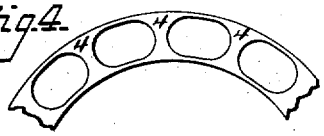
Figure 5:
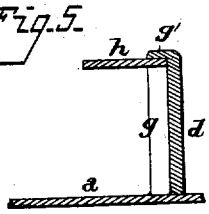

In the drawings, Figure 1 is a plan view of the wheel. Fig. 2 is a horizontal section taken through the gates; Figs. 3, 4, 5, detached views of parts of the gate and adjuncts.

*a* is the lower part of the curb. *b* is the upper part thereof. *c* are standards, which constitute guards for the gates *d*, as in the aforesaid patented wheel. The gates *d* are pivoted at the inner edges of these guards, forming close joints, as shown, and each gate has a slightly-curved inner face to correspond to the curve of the wheel, and is curved outwardly at the end *x* to form a flaring mouth that collects the water and directs it in a solid body to the buckets 4 of the wheel A. The inner end of each gate extends beyond the pivot-point, as shown, to form an abutment, 1, against which bears the end of the opposite gate, thereby forming a joint which becomes tighter the longer the gates are used, whereas without such extension the joints become more imperfect as the use of the wheel is continued. A flange, *e*, is formed upon the outer end of each gate and moves close to the outer edge of the guard *c*, forming, with the latter, (the gates,) the curbs and the boxes that prevent the pressure of water upon the backs of the gates, so that the same may open readily. The opening is further facilitated by the extension of the abutment 1 beyond the guard *c*, forming a surface on which the water bears, counteracting part of the pressure upon the opposite end of the gate, and by the curved face *x*, against which the water acts as it flows inward with a pressure tending to open the gate. These features, which are not in the aforesaid patented gate, overcome the objections resulting from the difficulty of opening the latter. At the outer vertical edge and at the top edge of the flange *e* are lips *g g'*, which, when the gate is closed, overlap the ends of the guards *c* and the projecting plates *h* of the curb *b*, and thus form tighter joints. Each gate is enlarged at the pivot-point to form a hub or projection, *s*, and the guard *c* lies out of the water-channel in such proximity to the hub that the water flowing past the guard and hub will meet with no obstructions on its passage to the wheel. The mutual conformation of the guard and gate, as shown, contribute to this result, the hub working in the corresponding depression in the guard, so that the changes in the position of the gate will not result in any break in the face over which the water flows. The gates are opened by means of rods *i*, that connect them with a disk, *j*, placed around the wheel-shaft *l*, and which disk is provided with a cogged segment, *n*, which segment meshes with a pinion, O, on an upright shaft, *t*, that is provided with a suitable hand-wheel for turning the same. The top of the curb is provided with a hub, *v*, that has suitable holes, 2, for the reception of tallow or oil for lubricating the spindle. Over this hub is placed a cap, 3', to exclude dust and dirt. The wheel is cast in one solid piece, is hollow in the center, so as to be as light as possible, and has a band, 3, around the lower ends of the buckets 4. The buckets are so shaped that as the water passes through the chutes it strikes them with full force and starts the wheel by concussion. The buckets are contracted in size toward the lower parts, and assume a circular shape back of the band, and have a circular vent or discharge. As a result of this shape, the water is caused to act by both its own weight and by its reaction. The circular discharge-opening insures a free discharge of the water and a greater reaction.

I claim—

1. The horizontally-moving pivoted gate *d*, having a fixed flange, *e*, forming part thereof, and with a vertical lip, *g*, on the edge of said flange, that overlaps the outer edge of the guard *c*, substantially as set forth.

2. The horizontally-moving gates *d*, having flanges *e*, with horizontal lips *g'* at their upper edges for overlapping the edges of the top plate, *h*, and forming water-tight joints, substantially as shown.

3. The horizontally-moving pivoted gates *d*, curved at *x*, near the outer ends, and provided with fixed flanges *e*, in combination with the guards *c*, substantially as set forth.

4. The gates *d*, pivoted to form projecting abutments 1, and provided with flanges *e*, in combination with the guards *c*, arranged substantially as specified.

5. The combination, in a turbine water-wheel, of vertical guards *c*, gates pivoted adjacent to the latter and enlarged and projecting inward in the direction of their length past the pivot-points and past the guards, one being recessed to receive the other, substantially as set forth.

In testimony whereof I have hereto set my hand in the presence of subscribing witnesses.

HENRY VAN DE WATER.

Witnesses:
JAMES WIMBLE,
HORACE T. COOK.